United States Patent
Nies

(10) Patent No.: US 7,762,771 B2
(45) Date of Patent: Jul. 27, 2010

(54) DEVICE FOR DRIVING A FIRST PART OF A WIND ENERGY TURBINE WITH RESPECT TO A SECOND PART OF THE WIND ENERGY TURBINE

(75) Inventor: Jacob Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 662 days.

(21) Appl. No.: 11/249,639

(22) Filed: Oct. 13, 2005

(65) Prior Publication Data

US 2007/0098549 A1 May 3, 2007

(51) Int. Cl.
*F01D 7/00* (2006.01)

(52) U.S. Cl. .................. 416/43; 416/61; 416/169 R; 416/170 R

(58) Field of Classification Search ............... 415/122.1, 415/118, 123, 124.1; 416/27, 43, 61, 169 R, 416/170 R
See application file for complete search history.

(56) References Cited

U.S. PATENT DOCUMENTS

| 2,605,850 | A | * | 8/1952 | Kiehaefer | 416/169 R |
|---|---|---|---|---|---|
| 4,142,830 | A | | 3/1979 | Schonball | |
| 4,430,575 | A | * | 2/1984 | Quigg | 290/52 |
| 4,493,465 | A | * | 1/1985 | Howlett et al. | 244/17.13 |
| 4,503,673 | A | * | 3/1985 | Schachle et al. | 60/398 |
| 4,527,683 | A | | 7/1985 | Mathews | |
| 4,648,797 | A | * | 3/1987 | Martin | 416/27 |
| RE33,514 | E | | 1/1991 | Ciolli | |
| 5,593,012 | A | | 1/1997 | Aho | |
| 5,818,183 | A | | 10/1998 | Lambert et al. | |
| 6,099,433 | A | | 8/2000 | Brouwer | |
| 6,227,803 | B1 | | 5/2001 | Shim | |
| 6,966,754 | B2 | * | 11/2005 | Wobben | 416/61 |
| 7,008,114 | B2 | | 3/2006 | Derscheid et al. | |
| 7,160,083 | B2 | * | 1/2007 | Pierce et al. | 416/61 |
| 2004/0151577 | A1 | | 8/2004 | Pierce et al. | |
| 2004/0151578 | A1 | | 8/2004 | Wobben | |
| 2004/0253093 | A1 | * | 12/2004 | Shibata et al. | 415/4.1 |
| 2005/0196280 | A1 | | 9/2005 | Gonzalez et al. | |
| 2006/0002792 | A1 | | 1/2006 | Moroz et al. | |

* cited by examiner

*Primary Examiner*—Edward Look
*Assistant Examiner*—Aaron R Eastman
(74) *Attorney, Agent, or Firm*—James McGuinness, Esq.; Armstrong Teasdale LLP

(57) ABSTRACT

A device for driving a first part of a wind turbine with respect to a second part of the wind turbine includes a driving element for engagement with the first part. The device also includes a driving unit including a housing to be fixedly connected to the second part, a motive generation means for generating motion of the motive element, and a motion transferring means for transferring the motion of the motive element to the driving element; and at least one slip coupling arranged between at least one of the motive element of the driving unit and the motion transferring means, the motion transferring means and the driving element, and within the motion transferring means, wherein the slip coupling is adjusted to slip if a torque acting on the slip coupling due to a movement force acting on the driving element exceeds a predetermined maximum torque.

17 Claims, 3 Drawing Sheets

DEVICE FOR DRIVING A FIRST PART OF A WIND ENERGY TURBINE WITH RESPECT TO A SECOND PART OF THE WIND ENERGY TURBINE

BACKGROUND OF THE INVENTION

The present invention relates to improvements of wind energy turbines and, in particular, to a device for driving a first part of a wind energy turbine with respect to a second part of the wind energy turbine or vice versa.

Modern wind energy turbines are provided with pitch and yaw drives. By means of the yaw drive it is possible to azimuthally drive the nacelle of a wind energy turbine with respect to its tower rotatably supporting the nacelle. A pitch drive is used to adjust the rotor blade of a wind energy turbine rotor. For each rotor blade usually one separate pitch drive is provided.

Both pitch and yaw drives of wind energy turbines have brakes on the motion generating means which normally includes an electrical motor. Moreover, the electrical motor often includes the brake system. Additionally or alternatively brakes may be built on the bearing structure between the first and second part. The brakes of the pitch and yaw drives of a wind energy turbine are operable to prevent unallowed relative rotation of the one part (rotor blade or nacelle) with respect to the other part (hub or tower, respectively). However, it may happen that wind forces act on the rotor blade and nacelle which wind forces result in torques acting on the blade or on the nacelle which are higher than the break-loose torques. Since the inertia of the elements of the pitch and yaw drives are significant, the torques on the elements of the drives can rise to levels higher than the break-loose torque which may damage the drives.

It is known to provide the connection of the housing of a yaw drive to the nacelle with a slip coupling. If this coupling slips due to high wind forces acting on the nacelle, the complete housing of the yaw drive rotates with respect to the nacelle so that the electrical cables and, if provided, hydraulic conduits have to be designed accordingly to compensate for the rotation. This complicates the construction of the yaw drive.

BRIEF DESCRIPTION OF THE INVENTION

In one aspect of the invention a device is provided for driving a first part of a wind energy turbine with respect to a second part of the wind energy turbine. The device includes a driving element for driving engagement with the first part. The device also includes a driving unit including a housing to be fixedly connected to the second part, a motive generation means for generating motion of the motive element, and a motion transferring means for transferring the motion of the motive element to the driving element. The device further includes at least one slip coupling arranged between at least one of the motive element of the driving unit and the motion transferring means, the motion transferring means and the driving element, and within the motion transferring means. The slip coupling is adjusted to slip if a torque acting on the slip coupling due to a movement force acting on the driving element exceeds a predetermined maximum torque so as to prevent elements of the driving unit arranged between its housing and the slip coupling from being subjected to unallowed loads.

DETAILED DESCRIPTION OF THE INVENTION

Prior art yaw systems of wind energy turbines may undesirably be loaded to torques higher than the yaw drive can withstand. This may overload components in the drive or in the support structure. By not letting the yaw slip, the loads on components may be higher and thus require additional efforts to withstand the higher torques. The solution to this problem is the provision of a slip coupling limiting the maximum torques which the elements of the drive and its support structures are subjected to.

Figure 1:
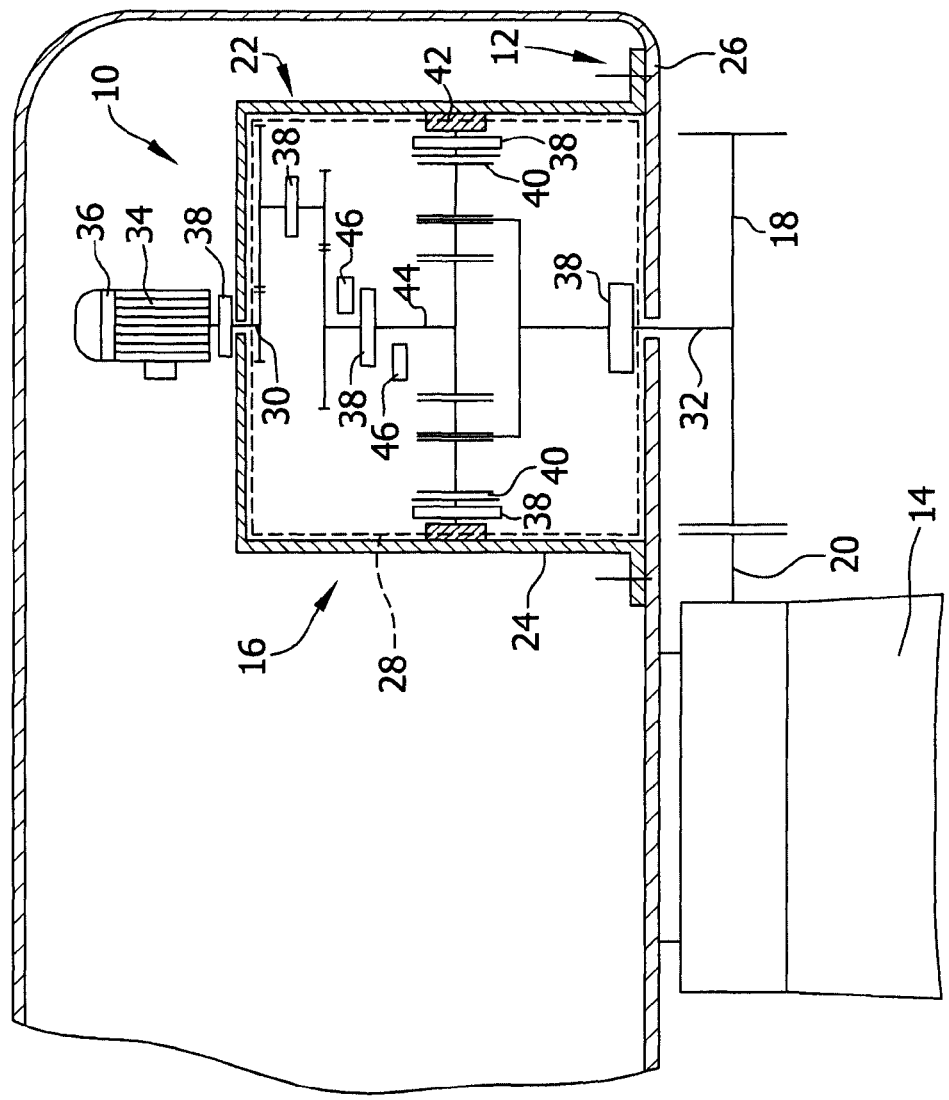
FIG. 1 is a schematic view illustrating a yaw drive of a wind energy turbine for azimuthally rotating the nacelle of the wind energy turbine with respect to its tower.

As shown in FIG. 1, a yaw drive 10 for rotating a nacelle 12 relative to a tower 14 of a wind energy turbine is provided with a device 16 provided with a driving element 18 arranged in driving engagement with tower 14. In this embodiment driving element 18 includes a gear engaged with a ring gear 20 arranged at tower 14. Within nacelle 12 there is arranged a driving unit 22 of device 16 having a housing 24 fixedly connected to a frame 26 of nacelle 12. A planetary plus two stage gear box 28 is arranged within housing 24 although other reduction concepts are also possible to realize. Gear box 28 is a motion transferring means for transferring the motion of a device input shaft 30 to an output shaft 32 to which driving element 18 is coupled. In one embodiment, device input shaft 30 is a motive element which, is rotated by a motion generation means 34 which in this embodiment, an electrical motor having a brake system 36.

In FIG. 1, reference numeral 38 indicates possible locations for a slip coupling to be arranged in order to prevent elements of device 16 and its support structures from being overloaded. For example, in one embodiment, the slip coupling is arranged at one of device input shaft 30 and at the output shaft 32. Both can be located inside or outside the gearbox housing. An alternative location for the slip coupling is within gear box 28. In this example one of the gear box stages is designed as a planetary gear within which the slip coupling is arranged between outer ring gear 40 and one of housing 42, output shaft 32, and a planetary gear input shaft 44.

Depending on the requirements and the design of the drive the slip coupling is arranged in either the high speed stage or the low speed stage of the drive. Alternatively, the slip coupling is arranged between the stages. The closer the slip coupling is arranged to the electrical motor 34 (motive generation means), the less mass moment of inertia will be isolated from the nacelle yaw movement.

Yaw drive 10 also includes a sensor means 46 for sensing relative movement of two elements of the driving unit 22 between which the slip coupling is arranged. By means of sensor means 46 it is possible to detect any slippage of the slip coupling so that it can be indicated that during the next maintenance stop of the wind energy turbine, maintenance work has to be performed on the slip coupling, too.

In accordance with the present invention, the device includes a driving element for driving engagement with the first part. The driving element is driven by a driving unit including a housing to be fixedly connected to the second part. The housing also includes a motion generation means (e.g. an electrical motor) for generating motion of a motive element (i.e. a shaft) and a motion transferring means for transferring the motion of the motive element to the driving element. At least one slip coupling is provided between two engaging elements of the driving unit and the driven element which slip coupling according to the invention is adjusted to slip if a torque acting on the slip coupling due to a movement force acting on the driving element exceeds a predetermine maximum torque. This maximum torque is higher than the torque to be transferred by the slip coupling for actively driving the one part with respect to the other part of the wind energy turbine. The slip coupling prevents the elements of the driving unit arranged between its housing and the slip coupling from being subjected to unallowed loads which may occur due to large wind forces acting on the parts of the wind energy turbine to be driven relative to each other by the device.

The at least one slip coupling is arranged within the housing or between adjacent engaging elements of the driving unit and the driven element, respectively. In other words, the housing of the driving unit is fixedly connected to the first or second part of the wind energy turbine, respectively. Therefore, the housing of the driving unit cannot slip relative to that part of the wind energy turbine to which the housing is fixedly connected.

The at least one slip coupling is arranged within a gear box of the motion transferring means of the driving unit or is arranged within at least one driven shaft of the driving unit in order to couple two parts of the driven shaft. The at least one slip coupling prevents both elements of the driving unit from being overloaded, which element when viewed in the direction of the site of force application to the respective part of the wind energy turbine are arranged behind the slip coupling.

In order to detect slipping of the slip coupling, a sensor means is included for sensing relative movement of the two elements of the driving unit between which the slip coupling is arranged.

To facilitate maintaining the slip coupling as described above, a preventative maintenance means, including sensor means 46, also described above, is provided for monitoring the operation of the slip coupling by applying a first test torque to the slip coupling up to which the slip coupling is not allowed to slip, and by applying a second test torque to the slip coupling at which the slip coupling has to slip, and does slip as indicated by sensor means 46. Such application of test torques determines parameters of torque for which the slip coupling will operate as described herein. As described above, if sensor means 46 detects any slippage of the slip coupling, maintenance work on the slip coupling can be performed during a maintenance stop. Device 16 is thus enabled when driving a first part with respect to another part within the parameters as described herein, prevents elements of driving unit 22 from being overloaded. In one embodiment, these test torques are introduced by using driving unit 22 in an over-torque mode or (in case of "n" driving units per bearing) by using "n−1" driving units 22 to apply the test torques of one driving unit 22, in a sequence of "n" times.

Figure 2:
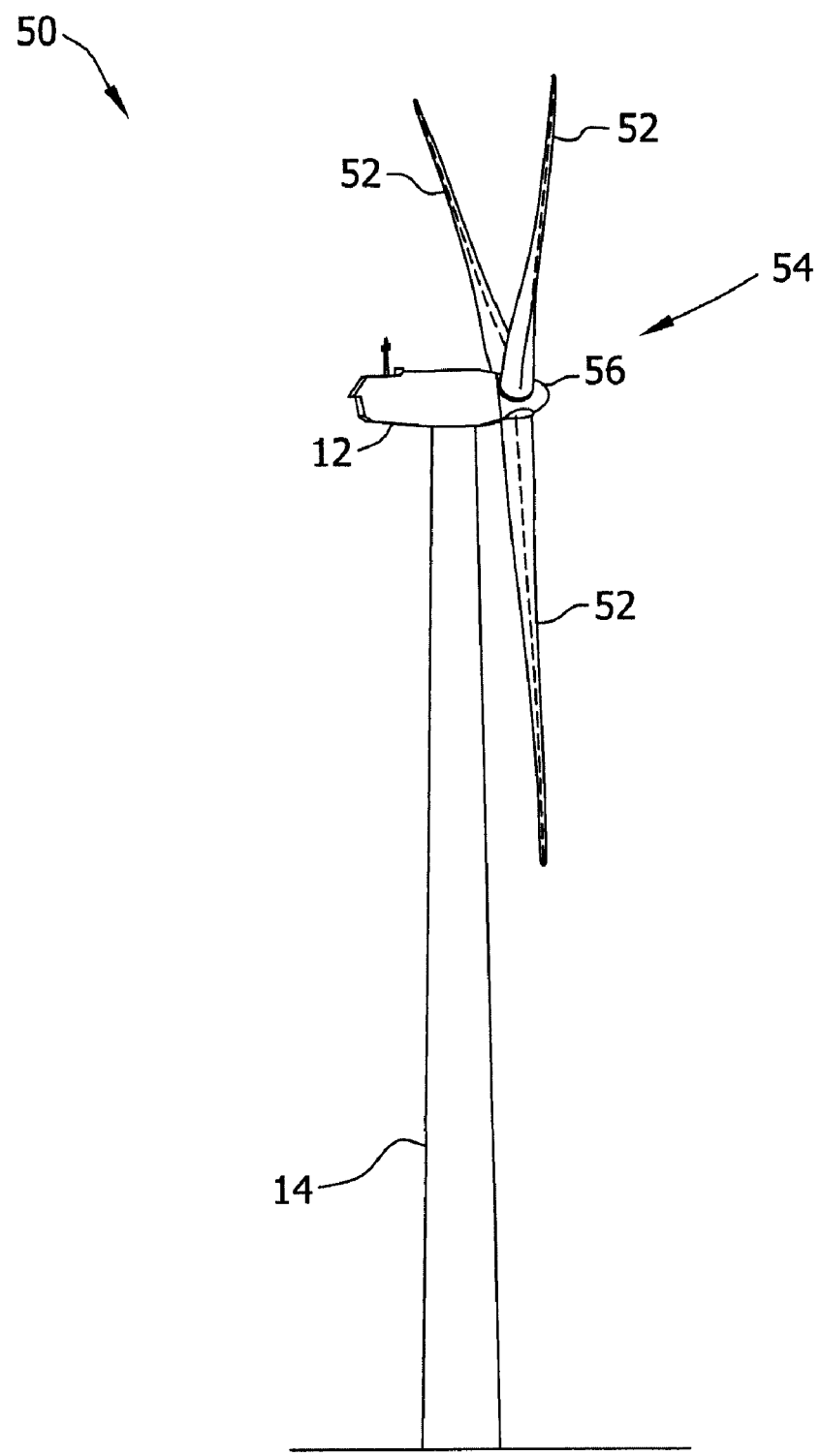
FIG. 2 is a schematic view of a wind energy turbine.
Figure 3:
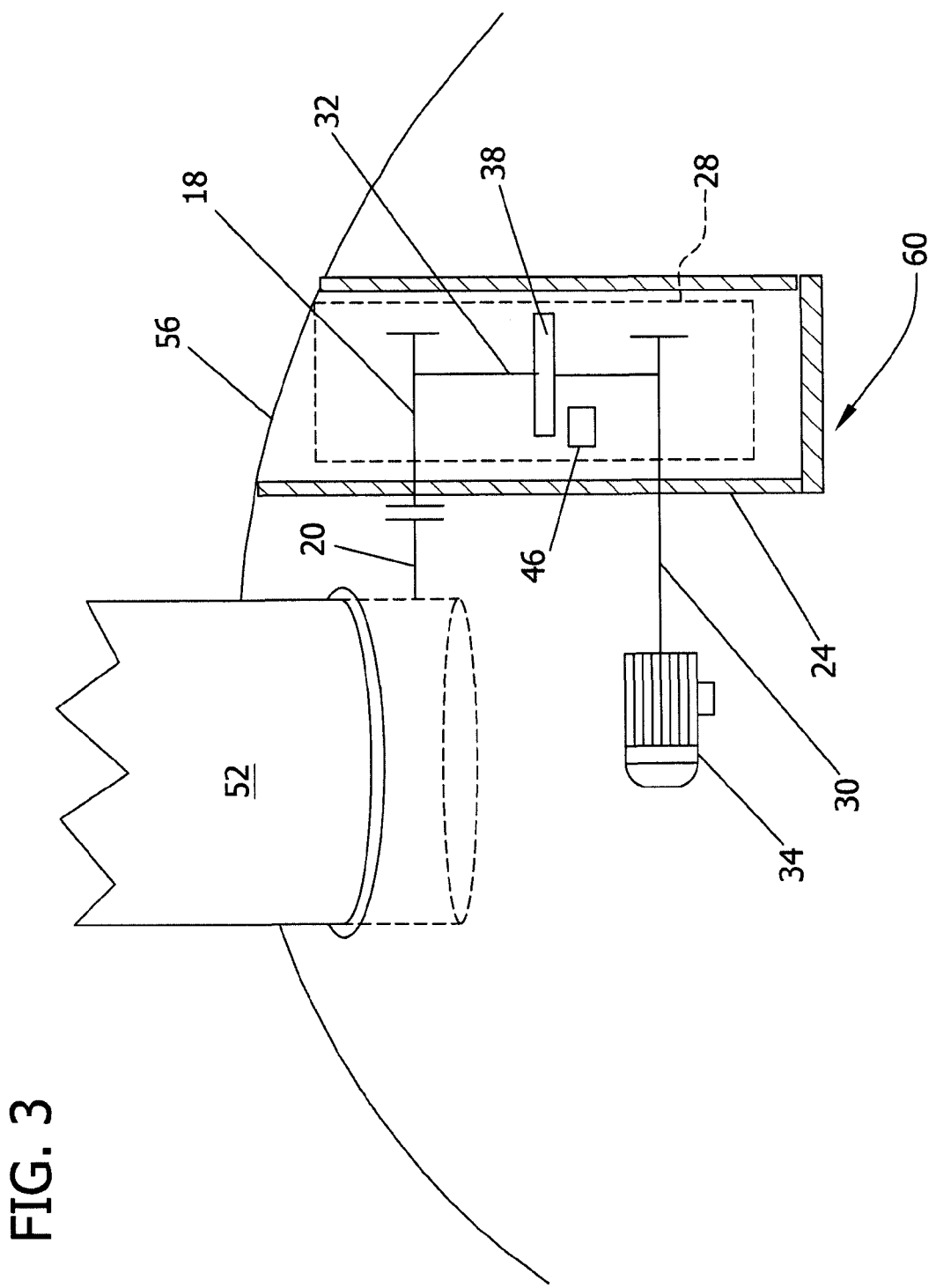
FIG. 3 is a schematic view of a pitch drive.

In reference to FIGS. 2 and 3, the device is used for pitch and yaw drives of a wind energy turbine 50. In a pitch drive the first part is a rotor blade 52 of a rotor 54 of the wind energy turbine 50 and the second part is a hub 56 of the rotor 54 of the wind energy turbine 50 rotatably supporting the rotor blade 52. Alternatively, the parts can be switched. The rotor 54 may comprise several rotor blades 52 each being provided with a pitch drive 60 provided with a slip coupling 38. As an alternative or in addition, a rotor blade 52 includes the device according to the invention for rotor blade tip adjustment purposes.

In the case of a yaw drive, the first part is a nacelle 12 of the wind energy turbine 50 and the second part is a tower 14 of the wind energy turbine 50 rotatably supporting the nacelle 12.

In the case of a main gearbox, the first part is a rotor 54 of the wind energy turbine 50 and the second part is the stationary part of the gearbox and generator combination of the wind energy turbine 50 rotatably supporting the rotor 54.

While the invention has been described in terms of various specific embodiments, those skilled in the art will recognize that the invention can be practiced with modification within the spirit and scope of the claims.

What is claimed is:

1. A device for driving a first part of a wind energy turbine with respect to a second part of the wind energy turbine, said device comprising:
   a driving element for driving engagement with the first part;
   a driving unit comprising a housing to be fixedly connected to the second part, a motive generation means for generating motion of a motive element, and a motion transferring means for transferring the motion of said motive element to said driving element;
   at least one slip coupling arranged between at least one of said motive element of said driving unit and said motion transferring means, said motion transferring means and said driving element, and within said motion transferring means, wherein said slip coupling is adjusted to slip if a torque acting on said slip coupling due to a movement force acting on said driving element exceeds a predetermined maximum torque so as to prevent elements of said driving unit arranged between said housing and said slip coupling from being subjected to unallowed loads; and
   further comprising sensor means for sensing relative movement of two elements of said driving unit between which said slip coupling is arranged, thereby detecting slippage of said slip coupling and thereby determining parameters of torque for which said slip coupling will operate.

2. The device according to claim 1 wherein said motion transferring means comprises a gear box and wherein said at least one slip coupling is arranged within or at said gear box.

3. The device according to claim 1 wherein said motion transferring means comprises at least one driven shaft and wherein said slip coupling is arranged at said at least one driven shaft.

4. The device according to claim 1, further comprising a means for monitoring operation of said slip coupling by applying a first test torque to said slip coupling up to which said slip coupling is not allowed to slip, and thereafter, applying a second test torque to said slip coupling from which said slip coupling does slip as indicated by said sensor means.

5. The device according to claim 1 wherein the first part is a nacelle of the wind energy turbine and the second part is a tower of the wind energy turbine rotatably supporting the nacelle.

6. The device according to claim 1 wherein the first part is a rotor blade of a rotor of the wind energy turbine and the second part is a hub of the rotor of the wind energy turbine rotatably supporting the rotor blade.

7. The device according to claim 1 wherein the first part is a rotor of the wind energy turbine and the second part is a gearbox-generator combination of the wind energy turbine rotatably supporting the rotor.

8. A wind energy turbine comprising:
a tower;
a nacelle rotatably coupled to said tower; and
a yaw drive system comprising:
 a driving unit comprising:
  a housing coupled to said tower;
  a motive generation means for generating motion of a motive element; and
  a motion transferring means for transferring the motion of said motive element to said driving unit; and
 a driving element coupled in driving engagement with said nacelle; and
 at least one slip coupling adjusted to slip in response to torque acting on said at least one slip coupling, such torque associated with a movement force acting on said driving element, such torque being a parameter that exceeds a predetermined maximum torque value preventing said driving unit from being subjected to a predetermined maximum load, said driving unit arranged between said housing and said at least one slip coupling, said at least one slip coupling arranged per at least one of:
  between said motive element of said driving unit and said motion transferring means;
  between said motion transferring means and said driving element; and
 within said motion transferring means; and
  further comprising sensor means for sensing relative movement of two elements of said driving unit between which said slip coupling is arranged, thereby detecting slippage of said slip coupling and thereby determining parameters of torque for which said slip coupling will operate.

9. A wind energy turbine in accordance with claim 8 wherein said motion transferring means comprises a gear box and wherein said at least one slip coupling is arranged within or at said gear box.

10. A wind energy turbine in accordance with claim 8 wherein said motion transferring means comprises at least one driven shaft and wherein said slip coupling is arranged at said at least one driven shaft.

11. A wind energy turbine in accordance with claim 8 further comprising passive sensor means for sensing relative movement of two elements of said driving unit between which said slip coupling is arranged.

12. A wind energy turbine in accordance with claim 8 further comprising a means for operation of said slip coupling by applying a first torque to said slip coupling up to which said slip coupling is not allowed to slip, and thereafter, applying a second torque to said slip coupling from which said slip coupling has to slip.

13. A wind energy turbine comprising:
a rotor hub;
at least one wind turbine blade rotatably coupled to said rotor hub; and
a blade pitch drive system comprising:
 a driving unit comprising:
  a housing coupled to said rotor hub;
  a motive generation means for generating motion of a motive element; and
  a motion transferring means for transferring the motion of said motive element to said driving unit; and
 a driving element coupled in driving engagement with said at least one wind turbine blade; and
 at least one slip coupling adjusted to slip in response to torque acting on said at least one slip coupling, such torque associated with a movement force acting on said driving element, such torque being a parameter that exceeds a predetermined maximum torque value preventing said driving unit from being subjected to a predetermined maximum load, the driving unit being arranged between the housing and said at least one slip coupling, said at least one slip coupling arranged per at least one of:
  between said motive element of said driving unit and said motion transferring means;
  between said motion transferring means and said driving element; and
 within said motion transferring means; and
  further comprising sensor means for sensing relative movement of two elements of said driving unit between which said slip coupling is arranged, thereby detecting slippage of said slip coupling and thereby determining parameters of torque for which said slip coupling will operate.

14. A wind energy turbine in accordance with claim 13 wherein said motion transferring means comprises a gear box and wherein said at least one slip coupling is arranged within or at said gear box.

15. A wind energy turbine in accordance with claim 13 wherein said motion transferring means comprises at least one driven shaft and wherein said slip coupling is arranged at said at least one driven shaft.

16. A wind energy turbine in accordance with claim 13 further comprising passive sensor means for sensing relative movement of two elements of said driving unit between which said slip coupling is arranged.

17. A wind energy turbine in accordance with claim 13 further comprising a means for operation of said slip coupling by applying a first torque to said slip coupling up to which said slip coupling is not allowed to slip, and thereafter, applying a second torque to said slip coupling from which said slip coupling has to slip.

* * * * *